US005472478A

United States Patent [19]
Brotzmann

[11] Patent Number: 5,472,478
[45] Date of Patent: Dec. 5, 1995

[54] REDUCTION OF METAL OXIDES AND VESSEL

[75] Inventor: Karl Brotzmann, Suizbach-Rosenberg, Germany

[73] Assignee: Technological Resources Pty. Ltd., Melbourne, Australia

[21] Appl. No.: 78,319

[22] Filed: Dec. 23, 1991

[86] PCT No.: PCT/EP91/02501

§ 371 Date: Oct. 27, 1993

§ 102(e) Date: Oct. 27, 1993

[87] PCT Pub. No.: WO/92/12265

PCT Pub. Date: Jul. 23, 1992

[30] Foreign Application Priority Data

Dec. 29, 1990 [DE] Germany ............ 40 42 176.7

[51] Int. Cl.[6] .................................. C21B 11/06
[52] U.S. Cl. .............. 75/414; 75/501; 75/502; 75/707; 266/173; 266/182; 266/186
[58] Field of Search ............ 75/414, 707, 500, 75/501, 502; 266/173, 176, 182, 186

[56] References Cited

U.S. PATENT DOCUMENTS

| | | | |
|---|---|---|---|
| 3,542,352 | 11/1970 | Themelis et al. | 266/163 |
| 4,798,624 | 1/1989 | Brotzmann et al. | 266/176 |
| 4,936,908 | 6/1990 | Takahashi et al. | 75/501 |
| 5,051,127 | 9/1991 | Hardie et al. | 75/492 |

*Primary Examiner*—Melvyn Andrews
*Attorney, Agent, or Firm*—Nikaido, Marmelstein, Murray & Oram

[57] ABSTRACT

A method of reducing metal oxides in a vessel containing a molten bath, the bath comprising a metal layer and a slag layer, wherein metal oxides and carbonaceous material are introduced into the bath, gas is injected into the slag layer to case the eruption of molten slag parts, droplets and/or streams into the gas space above the bath and oxygen-containing gas is injected into the gas space to case post-combustion.

18 Claims, 1 Drawing Sheet

REDUCTION OF METAL OXIDES AND VESSEL

The present invention relates to a method of reducing metal oxides, in particular iron ore, and to a vessel for use in the method.

There are two methods of reducing iron ore which have obtained particular significance.

In the first method iron ore, preferably pre-heated and pre-reduced, and coal are injected into or onto an iron bath in a vessel. The coal is dissolved in the iron bath and the iron ore is reduced to molten iron. The method includes injecting an oxygen-containing gas into the gas space above the iron bath to post-combust CO and $H_2$ from the iron bath so that a considerable portion of the energy released is transferred to the iron bath. In a preferred form of the method coal and oxygen-containing gas are injected into the iron bath through bottom tuyeres and cause droplets/streams of molten metal and slag to be ejected upwardly into the gas space to provide a medium for transferring efficiently the energy released by the post-combustion of CO and $H_2$. However, whilst the method has the advantage of efficient energy transfer to the iron bath to balance the heat loss from the iron bath due to the endothermic reduction of iron ore, a disadvantage of the method is that a proportion of the molten iron ejected into the gas space is oxidized and must be re-reduced in the iron bath.

In the second method the undesirable oxidation of molten iron is avoided by separating the molten iron from the gas space by a relatively deep slag layer and reducing the rate of bottom blowing. Thus, there is a minimal contact between the molten iron and the gas space. The major disadvantage of the method is that it is difficult to transfer efficiently energy released by post-combustion in the gas space to the iron bath. A further disadvantage is that the poor energy transfer results in high waste gas temperatures which cause accelerated wear of refractory linings in the vessel.

SUMMARY OF THE INVENTION

An object of the present invention is to provide a method of reducing iron ore which alleviates the disadvantages of the known methods described in the preceding paragraphs.

According to the present invention there is provided a method of reducing metal oxides in a vessel containing a molten bath, the bath comprising a metal layer and a slag layer, the method comprising:

The term "metal layer" as used herein is understood to mean a layer that predominantly comprises metal.

The term "slag layer" as used herein is understood to mean a layer that predominantly comprises slag.

In effect, the slag layer separates the metal layer and the gas space above the bath so that oxidation of CO and any $H_2$ in the gas space does not interfere with reduction of metal oxides in the metal layer and vice versa, and the injection of gas directly into the slag layer makes possible efficient transfer of heat generated by the post-combustion of CO and any $H_2$ in the gas space to the slag layer and subsequently to the metal layer to balance the heat loss in the reduction of metal oxides.

It is preferred that metal oxides and carbonaceous material are each injected into and onto the bath.

It is preferred that the carbonaceous material be selected from one or more of the group comprising coal, spent pot linings from aluminium smelting furnaces, and sewage sludge. It is particularly preferred that the carbonaceous material comprises coal.

It is preferred that the gas injected into the slag layer be selected from one or more of an inert gas, recycled process gas, CO, $CO_2$, natural gas, propane, or butane. It is particularly preferred that the inert gas be nitrogen.

According to a preferred embodiment of the present invention the outlet openings of the means for injecting a gas into the slag layer are arranged below the bath surface of the slag layer in a distance from the side wall of the vessel. It is advantageous not to introduce the gas stream into the slag layer right at the side wall of the vessel as it is in the case with side wall tuyeres in a converter-like vessel but in a distance from the side wall. For the formation of an eruption zone consisting of slag parts, droplets and/or streams and the enlargement of the surface of the slag layer achieved thereby it had shown advantageous to arranged the means for injecting the gas into the slag layer in a distance from the vessel wall corresponding to at least five times the diameter of the tuyeres for injecting the gas. The vessel wall can be in the form of a vertical wall as embodied for instance in a cylindrical smelt reduction reactor. If the wall is inclined, e.g. in the form of a conus then the line which is formed by the non-moved surface of the slag layer on the vessel wall is the point from which the distance of the injecting tuyeres is calculated. Tuyere diameters, i.e. the outer diameter which is considered, are in the range of 10 mm to 150 mm and preferably 25 mm to 60 mm.

According to a preferred embodiment of the present invention the gas is injected into the slag layer in a direction towards the surface of the slag layer. The introduction can be perpendicular to the slag layer surface, which is preferred, or in an inclination towards the surface of the slag layer. This form of gas introduction is in contrast to introducing the gas into the slag layer with an inclination away from the surface of the slag layer or parallel to the slag layer surface. This preferred form of gas introduction improves the formation of an eruption zone and minimized the deterioration of the vessel lining.

It is preferred that the oxygen-containing gas be selected from the group comprising oxygen, air and steam. It is particularly preferred that the air be preheated.

According to the present invention there is provided a vessel for reducing metal oxides, the vessel being adapted for holding a molten bath comprising a metal layer and a slag layer thereon, the vessel comprising:

(a) a means for injecting metal oxides into and/or onto the bath and carbonaceous material into and/or onto the bath so that the metal oxides are smelted and reduced to metal in the metal layer;

(b) a means for injecting a gas into the slag layer to cause the eruption of molten slag parts, droplets and/or streams into a gas space above the bath with minimal entrainment of metal from the metal layer; and (c) a means for injecting oxygen-containing gas into the gas space to cause post-combustion of CO and any $H_2$ so that the heat generated by the post-combustion is transferred directly to the molten slag droplets and/or streams.

It is preferred that the base of the vessel comprises a lower tier and an upper tier, whereby in use the metal layer extends above the lower tier up to or below the level of the upper tier and the slag layer extends above the metal layer and the upper tier.

With such an arrangement it is preferred that the means for injecting the gas into the slag layer comprises tuyeres extending through the upper tier.

3

It is also preferred that the means for injecting metal oxides and/or carbonaceous material into the metal layer comprises tuyeres extending through the lower tier.

BRIEF DESCRIPTION OF THE DRAWING

The present invention is described further with reference to the accompanying drawing which is a schematic illustration of a preferred embodiment of a vessel for reducing metal oxides in accordance with the present invention.

DETAILED DESCRIPTION OF THE INVENTION

Figure 1:
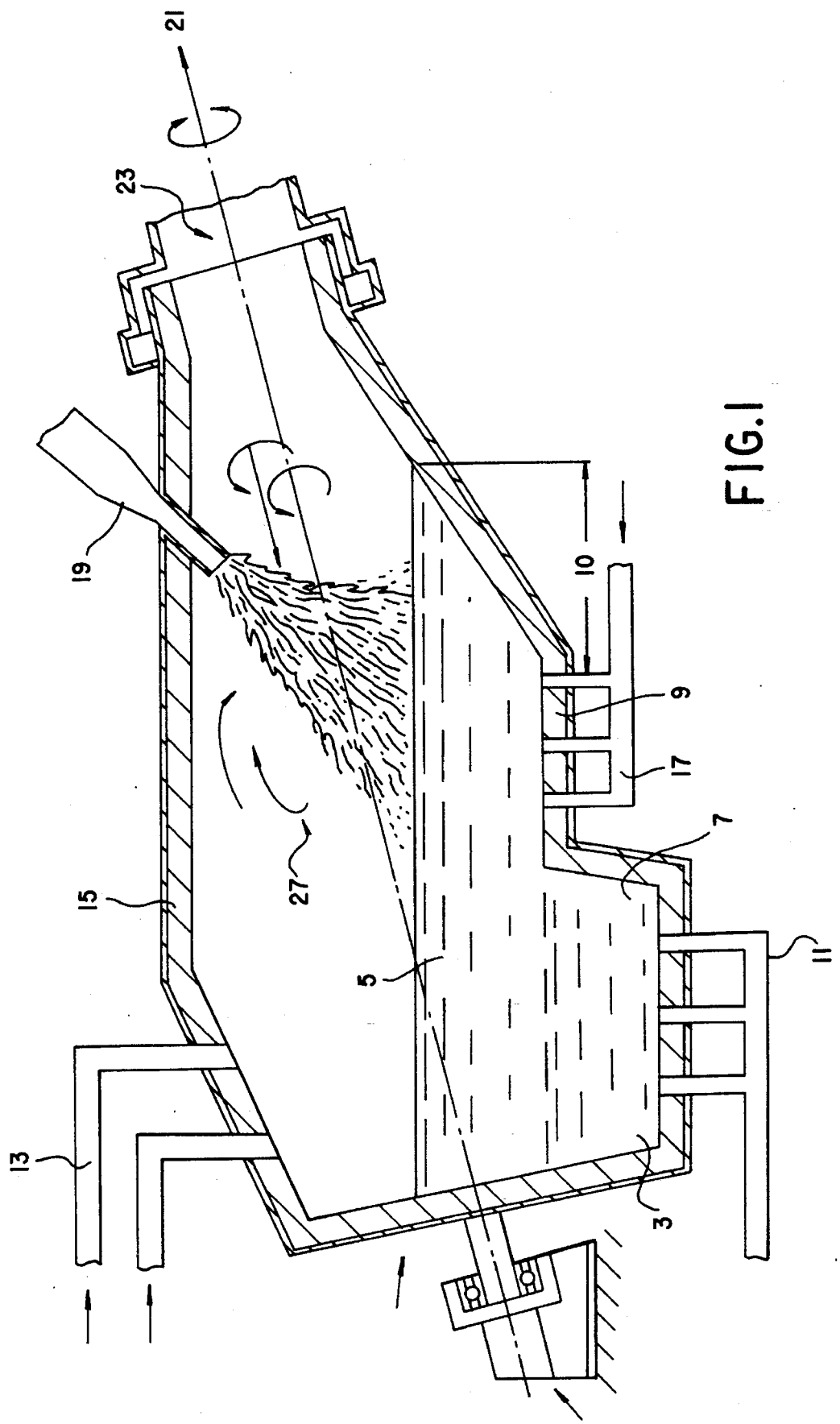

The preferred embodiment is described hereinafter in the context of reducing iron ore and/or partially reduced iron ore, although it is noted that the present invention is not limited to this application and extends to the reduction of any suitable metal oxides.

The vessel shown in the figure is formed from an outer metal shell and an inner lining of refractory material and, in use, the vessel contains a molten iron bath which comprises a metal layer 3 and a slag layer 5. The vessel is supported for rotation about an inclined axis 21 and is formed with a generally conical upper open end 23 through which waste gases can escape from the vessel.

The vessel is formed so that the base has a lower tier 7 and an upper tier 9 and, in use, the molten iron bath is controlled so that the metal layer 3 extends up to or below the level of the upper tier 9.

the vessel further comprises tuyeres 11 extending through the lower tier 7 and tuyeres 13 extending through the upper wall 15 for injecting partially pre-reduced iron ore and/or coal or any other suitable carbonaceous material into or onto the iron bath.

The vessel further comprises tuyeres 17 extending through the upper tier 9 for injecting nitrogen or any other suitable gas into the slag layer 5 to agitate the slag layer 5 to cause droplets and/or streams of molten slag to be ejected upwardly into a gas space above the iron bath.

The tuyeres 17 are mounted in a distance 10 from the vessel side wall in the bottom of the upper tier 9. The distance from the side wall is 300 mm which is ten times the outer diameter of the tuyeres being 30 mm.

The vessel further comprises a nozzle 19 arranged to extend through the upper wall 15 into the gas space to direct a stream of pre-heated air or any other suitable oxygen-containing gas towards the zone 27 (hereinafter referred as the "post-combustion zone") into which the droplets and/or streams of molten slag are ejected.

In use, in accordance with a preferred embodiment of the method of the present invention, iron ore injected into and/or onto the iron bath is reduced in the metal layer 3 and reaction gases CO and $H_2$ produced in the metal layer 3 are post-combusted in the post-combustion zone 27 to generate energy that is transferred to the metal layer 3 to maintain the heat balance in the metal layer 3. It can readily be appreciated that the metal layer 3 is a relatively quiescent zone because nitrogen is injected through the tuyeres 17 into the slag layer 5 and does not directly impinge on the metal layer 3. Thus, there is minimal molten iron ejected upwardly into the post-combustion zone 27. It is noted that this is accomplished without affecting the efficiency of heat transfer of energy generated in the post-combustion zone. Thus, in effect, the slag layer 5 separates the metal layer 3 and the post-combustion zone 27 so that oxidation of CO and any $H_2$ in the post-combustion zone 27 does not interfere with reduction of metal oxides in the metal layer and vice versa.

In addition, as can be seen from the figure, in the preferred embodiment the separation of the metal layer 3 and the post-combustion zone is further emphasized by positioning the top tuyeres 13 for injecting iron ore and/or coal onto the surface of the iron bath and the post-combustion zone 27 at opposite ends of the vessel.

The advantages of the preferred embodiment are illustrated clearly in the following example. In order to produce 1 t of molten iron, 1250 kg FeO at a temperature of 800° C. and 350 kg coal having a volatile component of approximately 30% were injected through top tuyere 13 onto the iron bath. Simultaneously, 200 kg iron ore fines, 50 kg fine dust from waste gas purification, and 80 kg coal were injected through bottom tuyere 11 into the iron bath, 1450 $Nm^3$ hot air at a temperature of 1300° C. was blown through nozzle 19 into the post-combustion zone 27, and between 30 and 300 $Nm^3$ nitrogen was injected through bottom tuyere 17 into the slag layer 5. The temperature of the molten iron bath was approximately 1500° C. and the waste gas temperature was approximately 1650° C. The thermal efficiency of energy transfer from the post-combustion zone 27 to the metal layer 3 was approximately 90%.

Many modifications may be made to the preferred embodiment without departing from the spirit and scope of the present invention.

In this regard, whilst the preferred embodiment of the vessel has two tiers it can readily be appreciated that this is not an essential feature of the present invention and direct injection of nitrogen or any other suitable gas into the slag layer 5 could be accomplished by other means such as nozzles positioned to extend from the bottom of a single tier base through the metal layer.

According to a preferred embodiment having an inclined wall section of the vessel the nozzles for introducing the gas into the slag layer 5 are positioned in a distance 10 from the point where the slag surface contacts the vessel side wall.

I claim:

1. A method of reducing metal oxides in a vessel containing a molten bath, the bath comprising a metal layer and a slag layer, the method comprising:

a) injecting metal oxides into and/or onto the bath and carbonaceous material into and/or onto the bath so that the metal oxides are smelted and reduced to metal in the metal layer whereby CO and $H_2$ are generated;

b) injecting a gas directly into the slag layer to cause the eruption of molten slag parts, droplets and/or streams into a gas space above the bath with minimal entrainment of metal from the metal layer; and c) injecting an oxygen-containing gas into the gas space to cause post-combustion of said CO and $H_2$ so that the heat generated by the post-combustion is transferred directly to the molten slag parts, droplets and/or streams.

2. The method defined in claim 1, wherein the metal oxides and carbonaceous materials are each injected into and onto the bath.

3. The method defined in claim 1, wherein the carbonaceous material is selected from one or more of the group consisting of coal, spent pot linings from aluminum smelting furnaces, and sewage sludge.

4. The method defined in claim 3, wherein the carbonaceous material comprises coal.

5. The method defined in claim 1, wherein the gas is injected into the slag layer through one or more inlet which is spaced a distance from the vessel side wall.

6. The method defined in claim 5, wherein the distance of the tuyeres for the gas injection into the slag layer from the vessel side wall equals to at least 5 times the tuyere diameter.

7. The method defined in claim 1, wherein the gas injected into the slag layer is injected towards the slag layer surface.

8. The method defined in claim 7, wherein the gas injected into the slag layer is injected perpendicular to the slag layer surface.

9. The method defined in claim 1, wherein the gas injected into the slag layer is selected from one or more of the group consisting of a inert gas, recycled process gas, CO, $CO_2$, natural gas, propane or butane.

10. The method defined in claim 9, wherein the inert gas is nitrogen.

11. The method defined in claim 1, wherein the oxygen-containing gas is selected from the group consisting of oxygen, air and steam.

12. A vessel for reducing metal oxides, the vessel being adapted for holding molten bath comprising a metal layer and a slag layer thereon, the vessel comprising:

a) a means for injecting metal oxides into and/or onto the bath and carbonaceous material into and/or onto the bath so that the metal oxides are smelted and reduced to metal values in the metal layer whereby CO and $H_2$ are generated;

b) a means for injecting a gas into the slag layer to cause the ejection of molten slag parts, droplets and/or streams into a gas space above the bath with minimal entrainment of metal values from the metal layer; and c) a means for injecting oxygen-containing gas into the gas space to cause post-combustion of said CO and $H_2$ so that the heat generated by the post-combustion is transferred directly to the molten slag parts, droplets and/or streams; and d) a base comprising a lower tier and an upper tier, whereby in use the metal layer extends above the lower tier up to or below the level of the upper tier and the slag layer extends above the metal layer and the upper tier.

13. The vessel defined in claim 12, wherein the means for injecting the gas into the slag layer comprises tuyeres extending through said upper tier.

14. The vessel defined in claim 13, wherein the means for injecting metal oxides and/or carbonaceous material into the metal layer comprises tuyeres extending through the lower tier.

15. The vessel defined in claim 12, wherein the means for injecting the gas into the slag layer are spaced a distance from the vessel side wall.

16. The vessel defined in claim 15, wherein the distance of the tuyeres for the gas injection into the slag layer from the side wall equals to at least 5 times the tuyere diameter.

17. The vessel defined in claim 12, wherein the means for injecting the gas into the slag layer are directed towards the slag layer surface.

18. The vessel defined in claim 17, wherein the means for injecting the gas into the slag layer are arranged perpendicular to the slag layer surface.

* * * * *